(12) United States Patent
Ma

(10) Patent No.: US 6,710,780 B2
(45) Date of Patent: Mar. 23, 2004

(54) IMAGE PROCESSING METHOD FOR PATCHING PIXELS OF DIGITAL IMAGE REPRESENTATION

(75) Inventor: Car-Lai Ma, Taipei (TW)

(73) Assignee: Tiger Color Inc., Taipei (TW)

( * ) Notice: Subject to any disclaimer, the term of this patent is extended or adjusted under 35 U.S.C. 154(b) by 204 days.

(21) Appl. No.: 09/968,788

(22) Filed: Oct. 3, 2001

(65) Prior Publication Data

US 2003/0063101 A1 Apr. 3, 2003

(51) Int. Cl.[7] .................................................. G09G 5/00
(52) U.S. Cl. ...................................................... 345/607
(58) Field of Search ................................ 345/581, 582, 345/589, 590, 593, 594, 606, 607

(56) References Cited

U.S. PATENT DOCUMENTS

2003/0011790 A1 * 1/2003 Schulte et al. ............... 358/1.1

* cited by examiner

Primary Examiner—Matthew C. Bella
Assistant Examiner—G. F. Cunningham
(74) Attorney, Agent, or Firm—Bacon & Thomas, PLLC

(57) ABSTRACT

An image processing method for patching pixels of a digital image representation shown on a screen of a computer, the method comprising the steps of reading a predetermined area to be patched on a digital image representation selected by a patch object and values of gray scale of pixels within the predetermined area; sorting the values of gray scale of the read pixels in a descending order; and selecting a value of gray scale of an intermediate index for replacing the value of gray scale of each of the pixels corresponding to the predetermined area to be patched.

5 Claims, 6 Drawing Sheets

IMAGE PROCESSING METHOD FOR PATCHING PIXELS OF DIGITAL IMAGE REPRESENTATION

FIELD OF THE INVENTION

The present invention relates to image processing and more particularly to an improved image processing method for patching pixels of digital image representation.

BACKGROUND OF THE INVENTION

Electronic technologies have known a rapid and a spectacular development leading to an increasing performance of computers and peripherals thereof. Further, a variety of inexpensive software are continuously available. This in turn makes computers and peripherals more popular among consumers for facilitating daily life, learning, and so on. For taking advantage of such trend, many AV product manufacturers endeavor to develop digitized products for attracting the newly formed many computer consumers. For example, in the case of digital camera, manufacturers usually give free image processing software when user buys a digital camera, thereby attracting more consumers to buy their products. By utilizing the image processing software, user may read the fetched digital image representation from digital camera and show the same from screen of a connected computer or TV. Alternatively, user may edit image therein. This has the benefits of saving cost of printing photographs, customizing digital image representation, saving storage space and related resources, and so forth.

Conventionally, patching for digital image representation is available in any of a variety of image processing software. Hence, user may view and modify the taken (or obtained) digital image representation in a quick manner. In general, for enabling user to modify defects on digital image representation, a speckles deletion or patch option is provided in such conventional image processing software for deleting or patching speckles in pixels of digital image representation. In a typical case, in deleting or patching speckles in digital image representation by the image processing software, user may first select an eraser object from a provided tool box for erasing undesired pixels from digital image representation. Next, select a pencil object for patching the position of the undesired pixels. Hence, its operation is tedious. Also, such patching can only be done by a skillful user. Thus, such conventional technique is not suitable to a beginner.

Conventionally, photo patching is available by a photo studio. Such photo patching process requires a high precision technique. Typically, an employee involved in the photo patching has to be skillful in patching defects on negatives (or digital image representation) as well as have an in-depth knowledge on photography and color science. Thereafter, it is possible of rendering a homogeneous color with respect to the surrounding on the same spot (i.e., position of defects on negative or digital image representation) after patching or deleting speckles. For example, in a picture 20 of digital image representation 10 as shown in FIG. 1, it is desired to delete hair 21 on forehead of picture 20 while rendering a homogeneous color on the position of deleted hair 21. For achieving this purpose, an experienced professional is required. Otherwise, the purpose may not be fulfilled even by performing options such as delete, copy, paste, and paint available from the image processing software. Further, even an acceptable rendering of color of the position of the deleted hair is done by a time consuming process and requires great effort. Moreover, as to the function provided by conventional image processing software for patching defects on digital image representation, i.e., patching or deleting speckles, it is still not acceptable. And in turn, user usually does not use conventional image processing software for patching defects on digital image representation. Thus improvement exists on the existing image processing software.

SUMMARY OF THE INVENTION

It is therefore an object of the present invention to provide an image processing method for patching pixels of a digital image representation shown on a screen of a computer. The method comprising the steps of a) reading the position to be patched on a digital image representation by a patch object and values of gray scale of pixels around the selected position; b) sorting the values of gray scale of the read pixels in a descending order; and c) selecting a value of gray scale of an intermediate index for replacing the value of gray scale of each of the pixels corresponding to the position to be patched.

In one aspect of the present invention, in patching digital image representation and deleting speckles it is possible of identifying picture to be patched and speckles to be deleted with respect to color of background in a predetermined area around a position to be patched. Hence, color of picture and its background will not change or be affected, resulting in a facilitation of patching operation and a significant improvement of image quality to the patched digital image representation.

In another aspect of the present invention, the tool box comprises at least one patch object. As a result, user may select one of a variety of patch objects for performing a fine or fuzzy patching operation on the position to be patched.

The above and other objects, features and advantages of the present invention will become apparent from the following detailed description taken with the accompanying drawings.

DETAILED DESCRIPTION OF THE PREFERRED EMBODIMENTS

The invention is directed to an image processing method for patching pixels of a digital image representation shown on a screen of a computer. The method comprising the steps of a) reading the position to be patched on a digital image representation by a patch object and values of gray scale of pixels around the selected position; b) sorting the values of gray scale of the read pixels in a descending order; and c)

selecting a value of gray scale of an intermediate index for replacing the value of gray scale of each of the pixels corresponding to the position to be patched. By utilizing the method, in patching digital image representation and deleting speckles it is possible of identifying picture to be patched and speckles to be deleted with respect to color of background in a predetermined area around a position to be patched. Hence, color of picture and its background will not change or be affected, resulting in a facilitation of patching operation.

Figure 1:
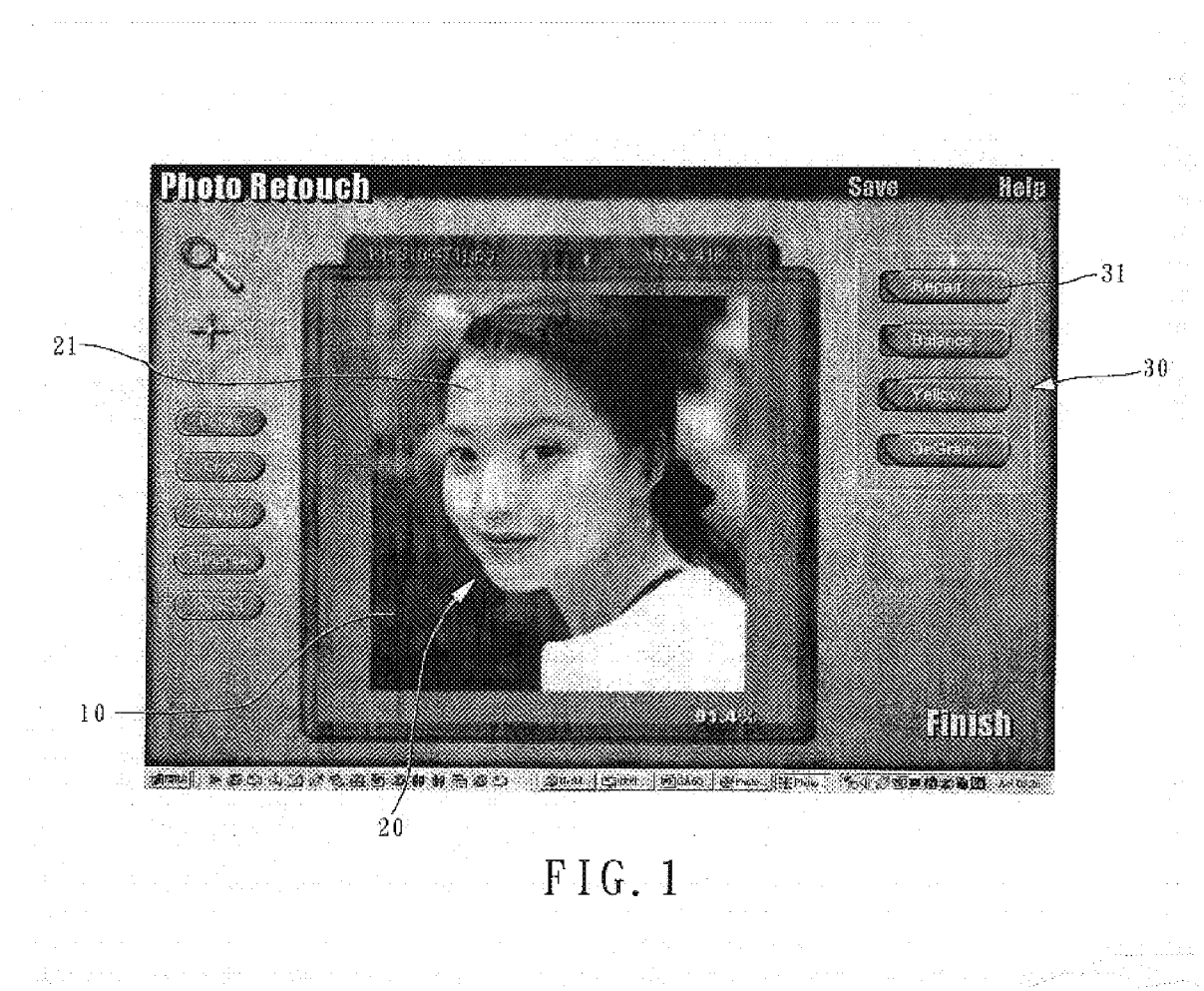
FIG. 1 illustrates a screen display of a digital image representation by executing an image processing software according to a first preferred embodiment of the invention.

Referring to FIGS. 1 to 5, there is shown a first preferred embodiment of the invention. In the embodiment, user my first read a digital image representation 10 by executing an image processing software installed in a computer. The read out digital image representation 10 is shown on screen of the computer (FIG. 1). Next, user may select a patch object 31 from tool box 30 made available by image processing software. Then user may manipulate patch object 31 by using mouse or any of other input devices (e.g., sensor pen of a digitizer) for patching a picture 20 (e.g., portrait of a girl as shown) in digital image representation 10.

Figure 2:
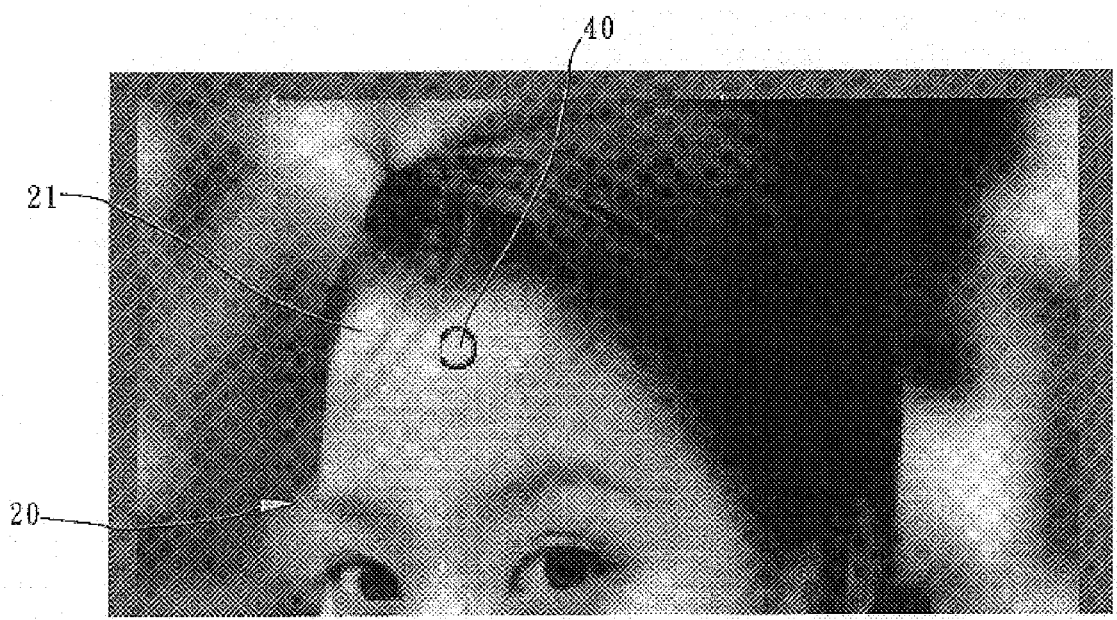
FIG. 2 is an enlarged view of a picture in the digital image representation of FIG. 1, showing a portion to be patched.

In the embodiment, if user desires to delete hair covered on forehead 21 of picture 20 it is possible of manipulating cursor 40 associated with patch object 31. In FIG. 2, cursor 40 is moved to hair covered on forehead 21 of picture 20 (i.e., the position to be deleted (or patched)). Next, click button of input device to select the hair. At this time, image processing software may read the position to be patched and values of gray scale of pixels within a square having a side length of nSquare centered on the selected position based on the following equation:

$$nSquare = nRadius * 2 + 1 \quad (1)$$

where nRadius is a pixel radius of a circle centered on the selected hair and nSquare is a square centered on the select hair and has a side length of nRadius*2+1.

In the embodiment, after value of nSquare is obtained, image processing software may read all pixels within the square having a side length of nSquare. Next, sort on values of gray scale of pixels in descending order. As understood that color of speckles (or lines) to be patched on digital image representation should have a distinct difference with respect to color of surrounding background. Also, speckles (or lines) to be patched on digital image representation should have less pixels than surrounding background. Hence, after sorting, indices of value of gray scale of pixels of speckles (or lines) to be patched are ones that are at front or rear. As to indices of other background pixels within square having a side length of nSquare, their indices are concentrated on central portion due to a large number of pixels. By observing a distribution of indices of pixels, it is easy to identify the color difference between background of picture to be patched and speckles to be deleted.

By utilizing such characteristics, after finishing sorting on values of gray scale of pixels, the invention may calculate an intermediate index based on the following equation:

$$\text{intermediate index} = (nSquare * nSquare - 1)/2 \quad (2)$$

Figure 3:
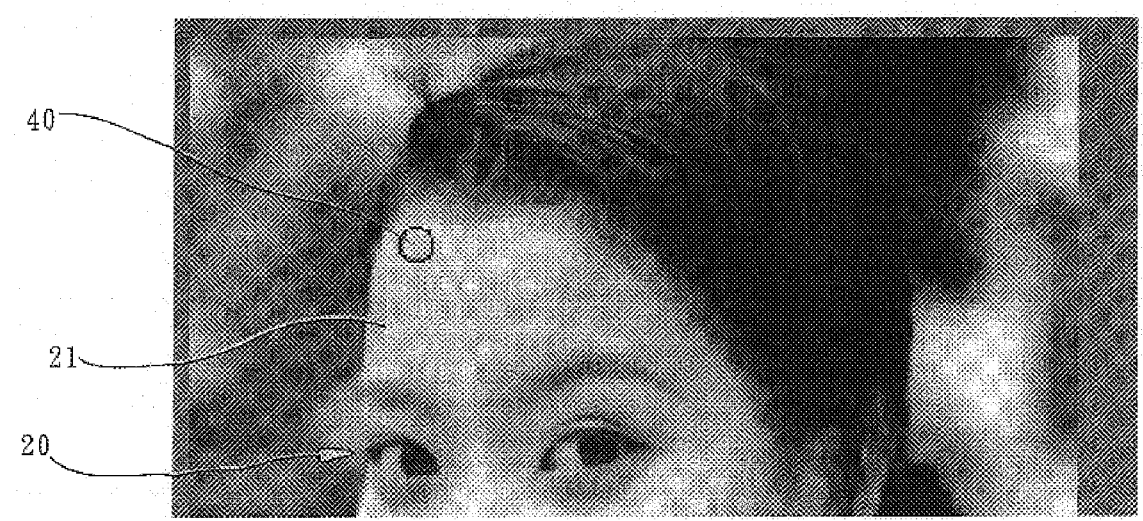
FIG. 3 is an enlarged view of FIG. 2, showing hair covered on forehead to be patched.
Figure 4:
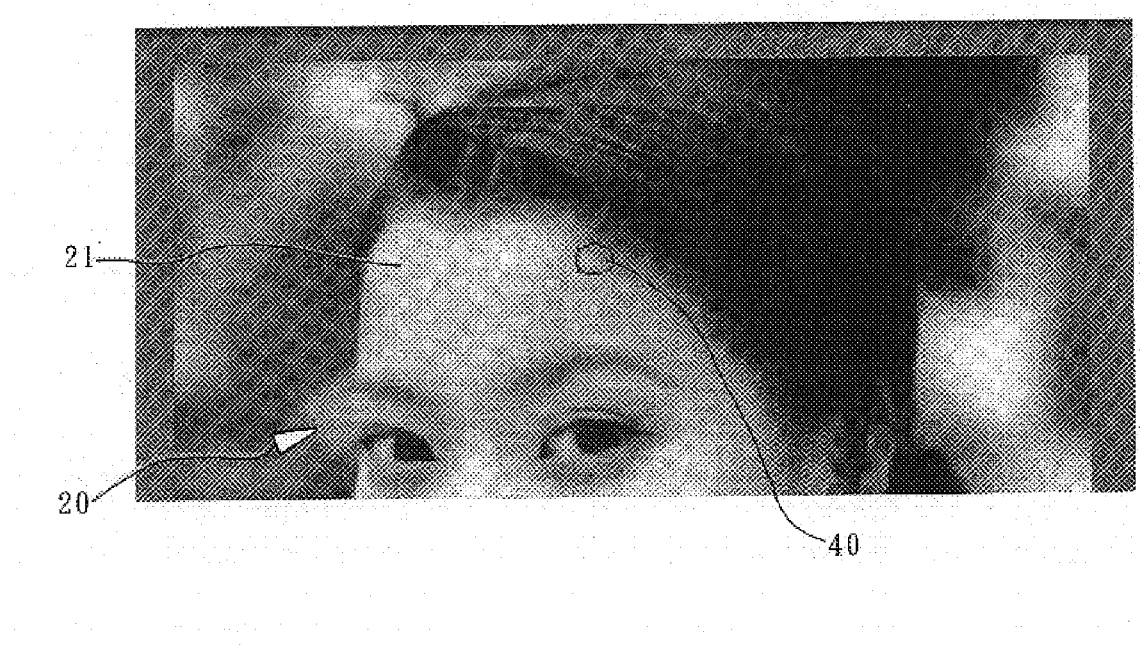
FIG. 4 is a view similar to FIG. 3, where hair covered on forehead has been patched.

Also, value of gray scale corresponding to intermediate index is selected as patching value for replacing the original value of gray scale corresponding to pixel at the position to be patched. Hence, user may move cursor 40 associated with patch object 31 to the position to be deleted on forehead 21 of picture 20. In FIG. 3, next click button of input device to select the hair. As a result, hair covered on forehead 21 of picture 20 will be deleted step by step. In FIG. 4, the deleted portion on forehead 21 will be patched with the same color as other undeleted portions of forehead 21 of picture 20. Hence, color of picture and its background will not change or be affected, resulting in a facilitation of patching operation on forehead 21.

Figure 5:
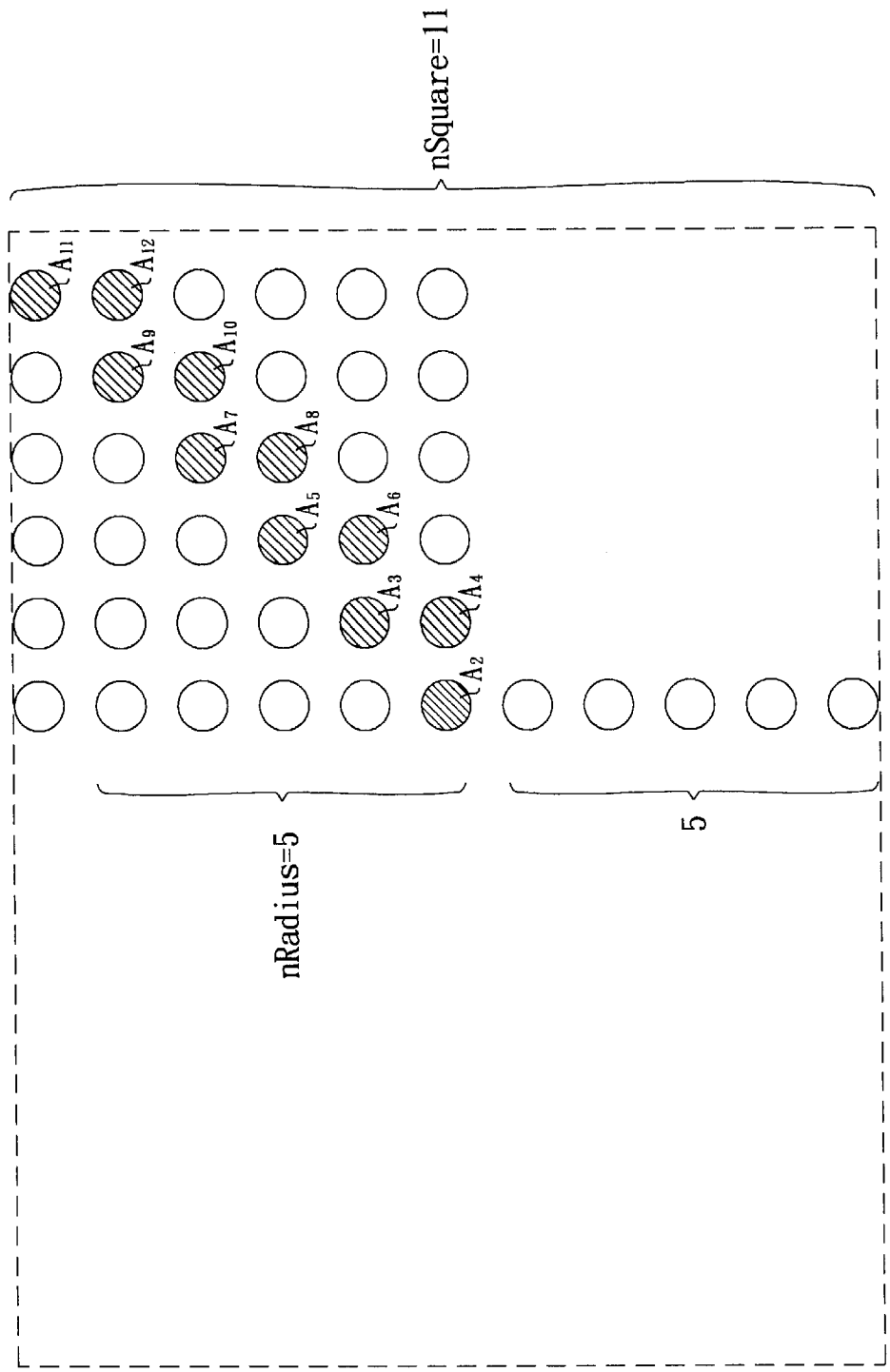
FIG. 5 is a schematic drawing showing pixels of the portion to be patched in FIG. 2.

In the embodiment, image processing software may select hair on forehead 21 of picture 20 as center and select five pixels around the position to be patched as nRadius (i.e., nRadius=5). Next substitute nRadius equal to 5 into equation (1) to obtain nSquare having a value of 11 (i.e., nSquare=nRadius*2+1=11). Then image processing software reads the position to be patched and value of gray scale of pixels within a square having a side length of 11 centered on the selected hair, i.e., a total of values of gray scale of 121 pixels are read as shown in FIG. 5. Further, a sorting on values of gray scale in descending order is performed. Moreover, values of gray scale of 11 speckles to be patched (i.e., A2, A3, A4, . . . , A11, and A12) are 220, 221, 221, . . . , 225, and 225 respectively and each of other surrounded 110 pixels has a value of gray scale of 35. Hence after finishing the sorting on values of gray scale of pixels, values of gray scale of 11 speckles to be patched (i.e., A2, A3, A4, . . . , A11, and A12) will be 1, 2, 3, . . . , 11, and 12 respectively. As to indices of other 110 background pixels within the square having a side length of nSquare, their indices are concentrated on central portion due to a large number of pixels. Hence, a background value (i.e., 35) of gray scale corresponding to intermediate index (which is equal to (nSquare*nSquare−1)/2 as shown in equation (2)) is obtained. Such value 35 of gray scale is used as patching value for replacing the original value (i.e., 220) of gray scale of pixel to be patched (i.e., A2). By repeating above operation, hair covered on forehead 21 of picture 20 will be deleted step by step. Also the deleted portion on forehead 21 will be patched with the same color as other undeleted portions of forehead 21 of picture 20. Hence, color of picture and its background will not change or be affected, resulting in a facilitation of patching operation.

Figure 6:
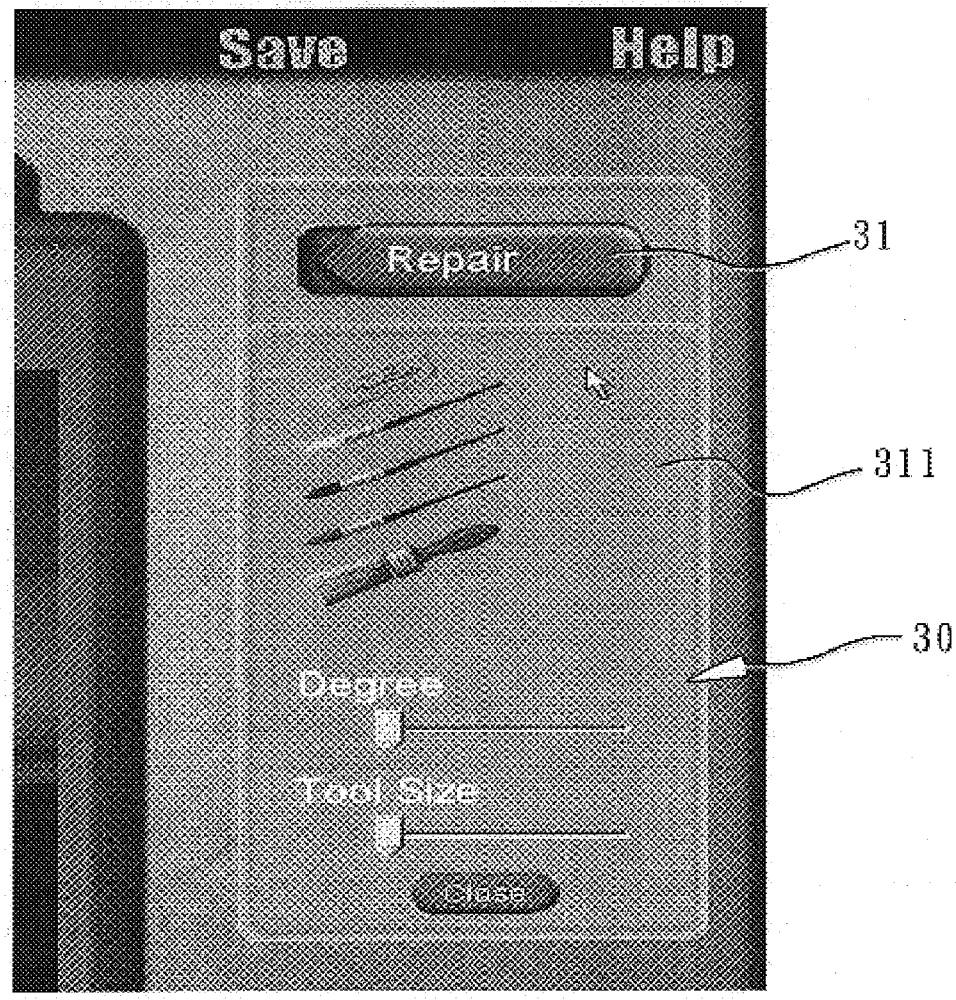
FIG. 6 illustrates a screen display of a tool box for patching according to a second preferred embodiment of the invention.

FIG. 6 illustrates a screen display of a tool box for patching according to a second preferred embodiment of the invention. In the embodiment, tool box 30 comprises at least one patch object 311. Hence, user may manipulate patch object 31 by using mouse or any of other input devices (e.g., sensor pen of a digitizer) for patching a picture 20 (e.g., portrait of a person) in digital image representation 10. Based on the clicked patch object 31, image processing software may read the position to be patched and values of gray scale of pixels therearound respectively by centering on at least one pixel on the selected position. Then, sort values of gray scale of the read pixels in descending order. Next, select value of gray scale of intermediate index for replacing value of gray scale of at least one pixel corresponding to the position to be patched. As a result, user may select one of a variety of patch object 31 for performing a fine or fuzzy patching operation on the position to be patched.

While the invention has been described by means of specific embodiments, numerous modifications and variations could be made thereto by those skilled in the art without departing from the scope and spirit of the invention set forth in the claims.

What is claimed is:

1. An image processing method for patching pixels of a digital image representation shown on a screen of a computer, the method comprising the steps of:

a) reading a predetermined area to be patched on a digital image representation selected by a patch object and values of gray scale of pixels within the predetermined area;

b) sorting the values of gray scale of the read pixels in a descending order; and c) selecting a value of gray scale of an intermediate index for replacing the value of gray scale of each of the pixels corresponding to the predetermined area to be patched, wherein the patch object is provided in a tool box made available by an image processing software so that the patch object is operable to patch pixels of the digital image representation via input means electrically coupled to the computer, and wherein the predetermined area is a square having a side length of nSquare centered on the predetermined area based on a first equation as below:

$$nSquare = nRadius*2+1$$

where nRadius is a pixel radius of a circle centered on the predetermined area, and nSquare is a square centered on the predetermined area and has a side length of nRadius*2+1.

2. The method of claim 1, wherein the image processing software reads all pixels within the square having the side length of nSquare prior to sorting on the values of gray scale of the pixels in a descending order.

3. The method of claim 2, wherein after finishing sorting on the values of grayscale of the pixels, the image processing software calculates an intermediate index based on a second equation as below:

$$\text{intermediate index} = (nSquare*nSquare-1)/2$$

and selects the value of gray scale corresponding to the intermediate index as a patching value for replacing the original value of gray scale corresponding to the pixel at the predetermined area to be patched.

4. The method of claim 1, wherein the tool box comprises at least one said patch object.

5. The method of claim 4, wherein the predetermined area to be patched and the values of gray scale of the pixels within the predetermined area are capable of being read respectively based on the variety of the patch object.

* * * * *